(12) United States Patent
Kanatani

(10) Patent No.: US 9,340,104 B2
(45) Date of Patent: May 17, 2016

(54) WHEEL UNIT

(75) Inventor: Tadayuki Kanatani, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 313 days.

(21) Appl. No.: 14/130,723

(22) PCT Filed: Jul. 4, 2012

(86) PCT No.: PCT/JP2012/067085
§ 371 (c)(1),
(2), (4) Date: Feb. 14, 2014

(87) PCT Pub. No.: WO2013/008694
PCT Pub. Date: Jan. 17, 2013

(65) Prior Publication Data
US 2014/0152075 A1 Jun. 5, 2014

(30) Foreign Application Priority Data

Jul. 8, 2011 (JP) .................................. 2011-152249

(51) Int. Cl.
*B60K 7/00* (2006.01)
*B60K 17/04* (2006.01)

(52) U.S. Cl.
CPC ............. *B60K 7/0007* (2013.01); *B60K 17/043* (2013.01); *B60K 2007/0038* (2013.01); *B60K 2007/0061* (2013.01); *B60K 2007/0092* (2013.01); *B60Y 2200/40* (2013.01); *B60Y 2200/84* (2013.01)

(58) Field of Classification Search
CPC . B60K 7/00; B60K 7/0007; B60K 2007/0061
See application file for complete search history.

(56) References Cited

U.S. PATENT DOCUMENTS

| | | | | |
|---|---|---|---|---|
| 6,688,416 B2* | 2/2004 | Higaki | ................. | B60K 7/0007 180/252 |
| 7,828,095 B2* | 11/2010 | Murata | ................. | B60K 7/0007 180/65.1 |
| 7,841,436 B2* | 11/2010 | Bussinger | ............ | B60K 7/0007 180/210 |
| 8,002,060 B2* | 8/2011 | Komatsu | .............. | B60K 7/0007 180/65.51 |
| 8,132,636 B2* | 3/2012 | Suzuki | ................. | B60K 7/0007 180/65.51 |

(Continued)

FOREIGN PATENT DOCUMENTS

| | | |
|---|---|---|
| JP | 7-81436 A | 3/1995 |
| JP | 11-255368 A | 9/1999 |

(Continued)

OTHER PUBLICATIONS

Official Communication issued in International Patent Application No. PCT/JP2012/067085, mailed on Aug. 21, 2012.

*Primary Examiner* — Katy M Ebner
(74) *Attorney, Agent, or Firm* — Keating & Bennett, LLP

(57) ABSTRACT

A wheel unit includes a motor, a pinion gear fixed to a rotating portion of the motor, a wheel including an annular ground surface and rotating about a final gear support shaft, a final gear fixed to the wheel directly or via another member, a speed reduction mechanism which decelerates rotation of the pinion gear and transmits the rotation to the final gear, and a gear case which accommodates the pinion gear, the speed reduction mechanism, and the final gear. A rotation support portion rotating along with the final gear and the wheel while being supported by the gear case is provided between the final gear and the wheel. An outside diameter of the rotation support portion is greater than an outside diameter of the final gear support shaft.

16 Claims, 13 Drawing Sheets

(56) References Cited

U.S. PATENT DOCUMENTS

| | | | |
|---|---|---|---|
| 8,261,866 B2* | 9/2012 | Ishida | B60K 7/0007 180/65.51 |
| 8,800,702 B2* | 8/2014 | Yamamoto | B60G 3/20 180/65.51 |
| 8,813,891 B2* | 8/2014 | Tsukamoto | B62M 7/12 180/220 |
| 2004/0049877 A1 | 3/2004 | Jones et al. | |
| 2004/0187249 A1 | 9/2004 | Jones et al. | |
| 2007/0266508 A1 | 11/2007 | Jones et al. | |
| 2008/0000041 A1 | 1/2008 | Jones et al. | |
| 2008/0000042 A1 | 1/2008 | Jones et al. | |
| 2008/0307590 A1 | 12/2008 | Jones et al. | |
| 2010/0257690 A1 | 10/2010 | Jones et al. | |
| 2012/0256472 A1* | 10/2012 | Takahashi | B60K 7/0007 301/6.5 |

FOREIGN PATENT DOCUMENTS

| | | |
|---|---|---|
| JP | 2004-195215 A | 7/2004 |
| JP | 2007-127493 A | 5/2007 |
| JP | 2007-131295 A | 5/2007 |
| JP | 2008-220882 A | 9/2008 |
| JP | 2009-189880 A | 8/2009 |
| JP | 2009-189881 A | 8/2009 |
| JP | 2010-25263 A | 2/2010 |
| JP | 2010-188205 A | 9/2010 |
| JP | 2010-188206 A | 9/2010 |
| JP | 2010-221061 A | 10/2010 |
| JP | 2010-264086 A | 11/2010 |
| JP | 2011-56298 A | 3/2011 |

* cited by examiner

WHEEL UNIT

BACKGROUND OF THE INVENTION

1. Field of the Invention

The present invention relates to a wheel unit.

2. Description of the Related Art

In a self-propelled electric appliance such as a cleaning robot, a wheel unit including a wheel and a motor that drives the wheel is mounted. For example, on the left and the right of an autonomous floor-cleaning robot 10 disclosed in Japanese Unexamined Patent Application Publication No. 2004-195215, main wheel subassemblies 42A and 42B are mounted. The main wheel subassembly of the related art includes wheels 42AW and 42BW attached to be rotatable and motors 42AM and 42BM which operate to drive the respective wheels (see, for example, paragraphs [0018] to [0021] and FIGS. 4 and 5 of Japanese Unexamined Patent Application Publication No. 2004-195215).

Hitherto, in this type of cleaning robot, a motor with a brush having large dimensions in an axial direction is used. When the motor and the wheel are arranged to be aligned in the axial direction, the dimensions of the wheel unit in the axial direction are increased. Therefore, in the related art, the motor is disposed on the outside of a ground surface of the wheel to reduce the dimensions of the wheel unit in the axial direction. Also in FIG. 4 of Japanese Unexamined Patent Application Publication No. 2004-195215, a state where the motors 42AM and 42BM are arranged on the outside of the ground surface of the wheel is illustrated.

However, when the motor is disposed on the outside of the ground surface of the wheel, the wheel unit is increased in size in a movement direction or a vertical direction. Therefore, the degree of freedom for a design of other parts of the cleaning robot is reduced. Therefore, there is a demand for a reduction in the dimensions of the wheel unit in the axial direction without an extension of the wheel unit in the movement direction or the vertical direction.

In contrast, in the wheel unit, a support structure for rotatably supporting a gear or the wheel is included. When the reduction in the size of the wheel unit is taken into consideration, there is a need to sufficiently ensure the durability of the support structure.

SUMMARY OF THE INVENTION

According to a first preferred embodiment of the present invention, a wheel unit includes: a motor; a pinion gear which is fixed to a rotating portion of the motor; a wheel which includes an annular ground surface and rotates about a final gear support shaft; a final gear made of a resin, which is fixed to the wheel directly or via another member; a speed reduction mechanism which decelerates rotation of the pinion gear and transmits the rotation to the final gear; and a gear case which accommodates the pinion gear, the speed reduction mechanism, and the final gear. A rotation support portion which rotates along with the final gear and the wheel while being supported by the gear case is provided between the final gear and the wheel. An outside diameter of the rotation support portion is greater than an outside diameter of the final gear support shaft. In addition, at least a portion of the final gear is positioned on an inside of a cylindrical or substantially cylindrical area surrounded by the ground surface.

According to the first preferred embodiment of the present invention, at least a portion of the final gear is positioned on the inside of the cylindrical or substantially cylindrical area surrounded by the ground surface. Accordingly, the dimensions of the wheel unit in a direction of the final gear support shaft are reduced. In addition, the outside diameter of the rotation support portion is greater than the outside diameter of the final gear support shaft. Accordingly, a large contact portion of the gear case and the rotation support portion are ensured. As a result, high durability is obtained in a support structure of the rotation support portion with respect to the gear case.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, exemplary preferred embodiments of the present invention will be described with reference to the drawings. In addition, in the following description, a direction along a final gear support shaft is referred to as an "axial direction". In addition, along the axial direction, a motor side is referred to as an "input side", and a wheel side is referred to as an "output side".

First Preferred Embodiment

Figure 1:
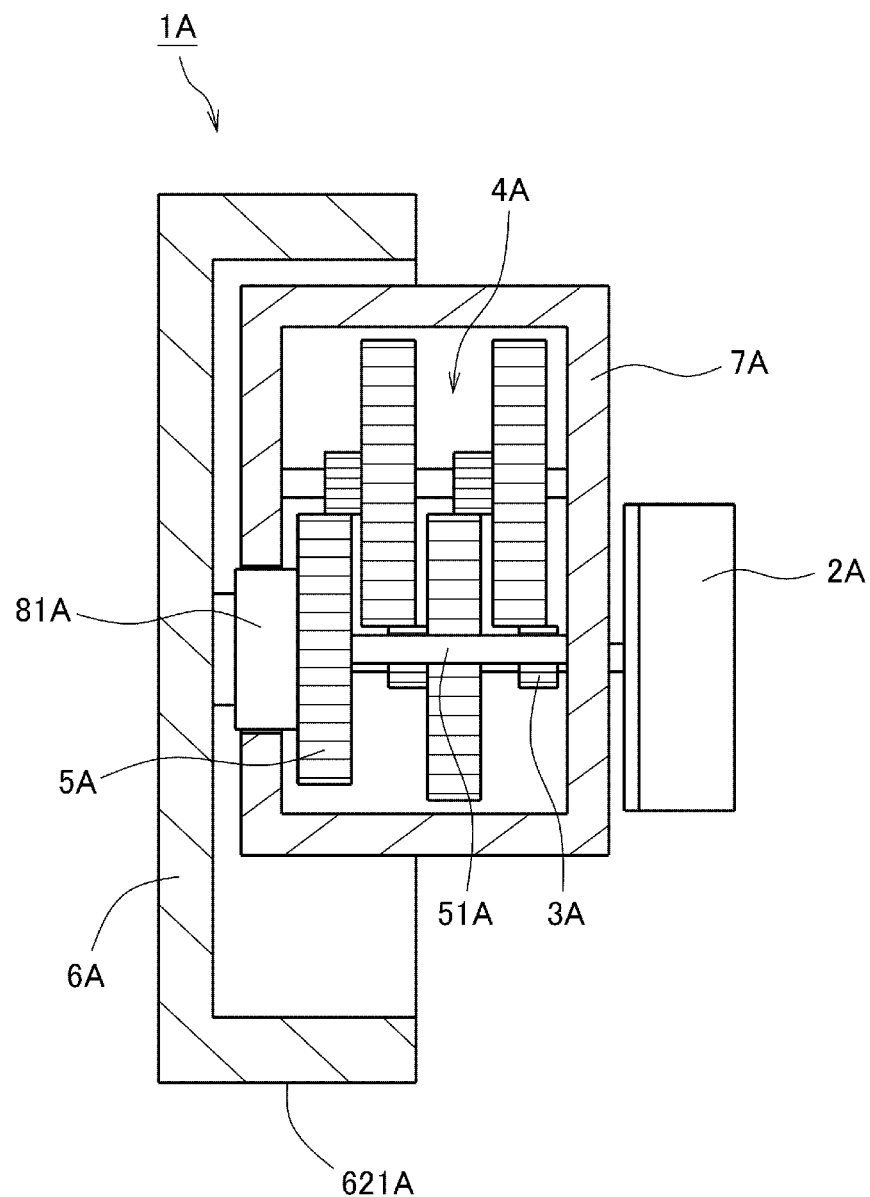
FIG. 1 is a front view of a wheel unit according to a first preferred embodiment of the present invention, which is partially cut-away for illustration purposes.

FIG. 1 is a front view of a wheel unit 1A according to a first preferred embodiment of the present invention. FIG. 1 illustrates a wheel 6A and a gear case 7A, which are cut-away for illustration purposes. As illustrated in FIG. 1, the wheel unit 1A preferably includes a motor 2A, a pinion gear 3A, a speed reduction mechanism 4A, a final gear 5A, the wheel 6A, and the gear case 7A. The pinion gear 3A is fixed to a rotating portion of the motor 2A. The speed reduction mechanism 4A decelerates rotation of the pinion gear 3A and transmits the rotation to the final gear 5A. The final gear 5A is preferably fixed to the wheel 6A directly or via another member. The wheel 6A preferably includes an annular ground surface 621A, and rotates about the final gear support shaft 51A. The pinion gear 3A, the speed reduction mechanism 4A, and the final gear 5A are preferably accommodated in an inner portion of the gear case 7A.

In addition, a rotation support portion 81A is preferably provided between the final gear 5A and the wheel 6A. The rotation support portion 81A rotates along with the final gear 5A and the wheel 6A while being supported by the gear case 7A.

As illustrated in FIG. 1, in the wheel unit 1A, the entire final gear 5A is positioned on the inside of a cylindrical or substantially cylindrical area surrounded by the ground surface 621A. However, only a portion of the final gear 5A may be positioned on the inside of the cylindrical or substantially cylindrical area surrounded by the ground surface 621A. Accordingly, compared to a case where the final gear 5A is disposed on the outside of the wheel 6A, the dimensions of the wheel unit 1A in the axial direction are reduced.

On the other hand, in this structure, it is difficult for a support structure of the rotation support portion 81A with respect to the gear case 7A to be widened in the axial direction. In the wheel unit 1A, an outside diameter of the rotation support portion 81A is larger than an outside diameter of the final gear support shaft 51A. Accordingly, a large contact portion of the gear case 7A and the rotation support portion 81A is ensured. As a result, the durability of the support structure of the rotation support portion 81A with respect to the gear case 7A is enhanced.

Second Preferred Embodiment

Figure 2:
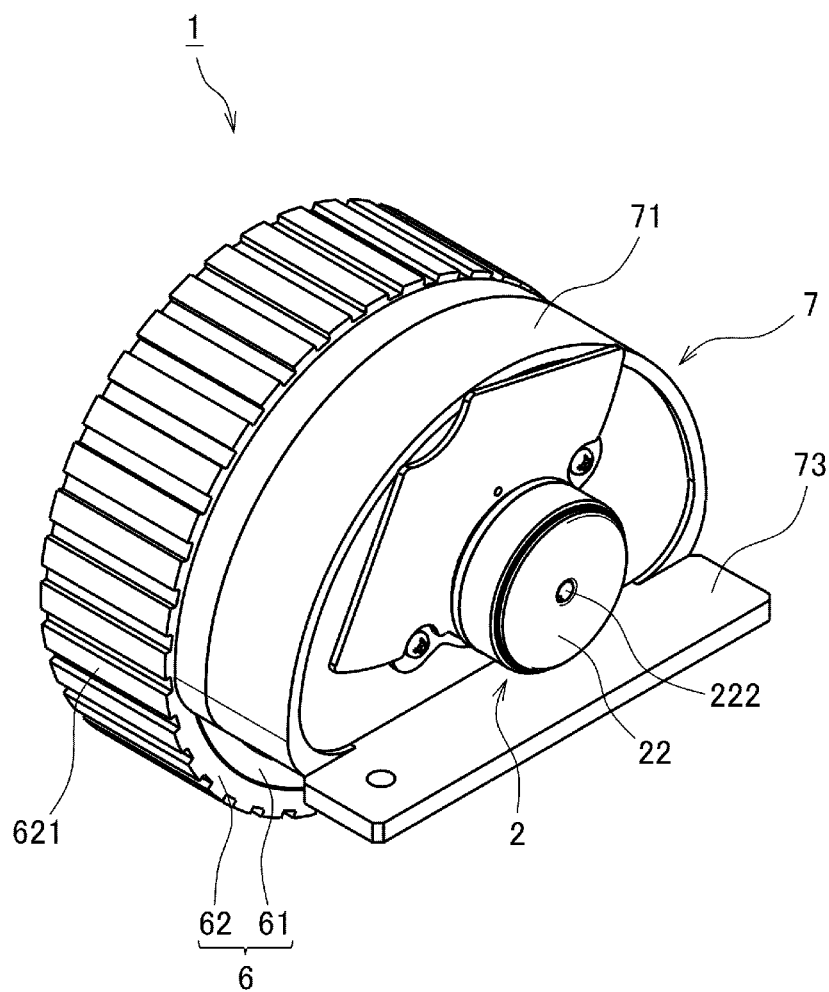
FIG. 2 is a perspective view of a wheel unit according to a second preferred embodiment of the present invention.
Figure 3:
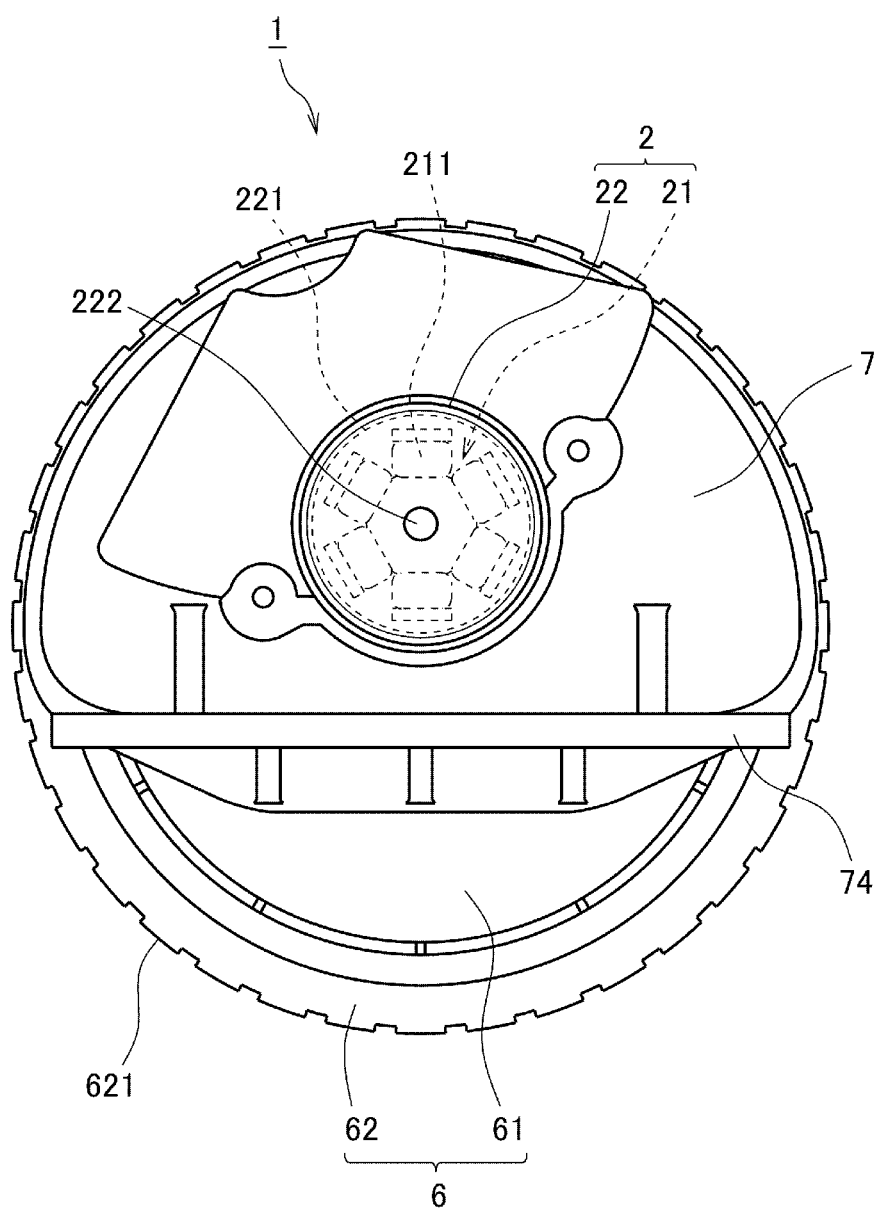
FIG. 3 is a side view of the wheel unit according to the second preferred embodiment of the present invention.
Figure 4:
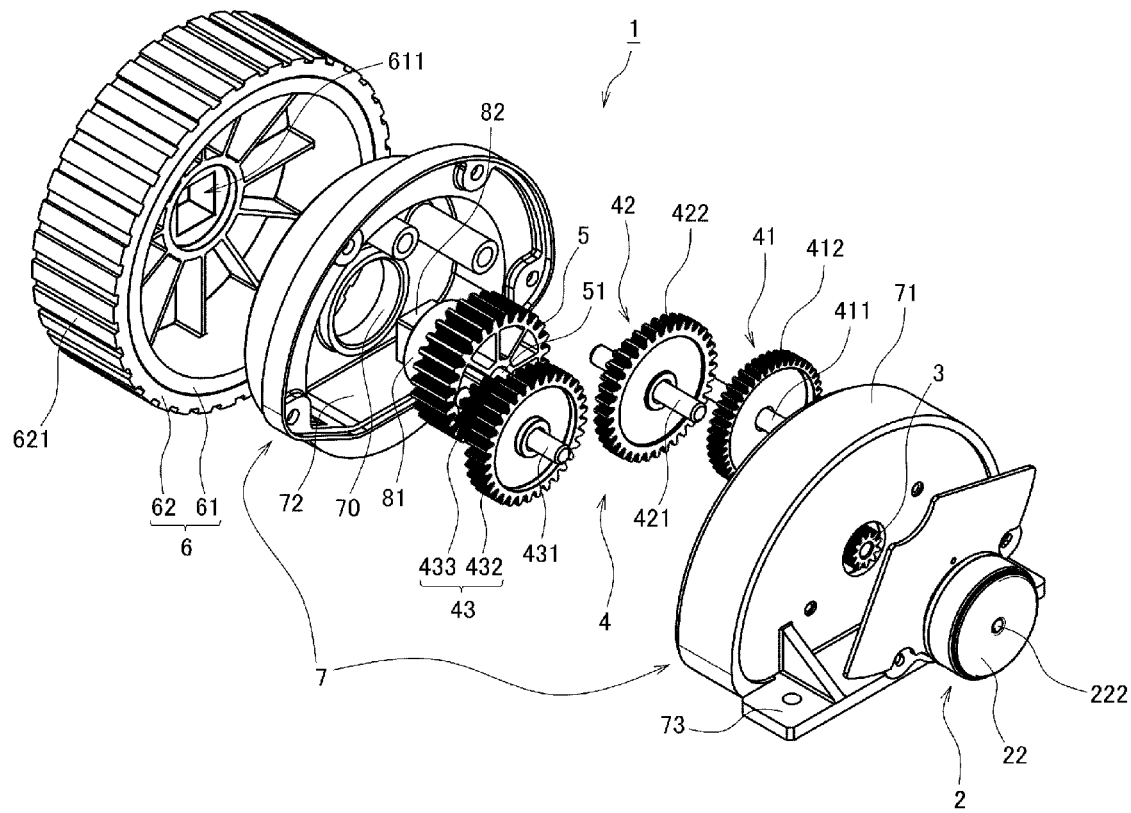
FIG. 4 is an exploded perspective view of the wheel unit according to the second preferred embodiment of the present invention.

FIG. 2 is a perspective view of a wheel unit 1 according to a second preferred embodiment of the present invention. FIG. 3 is a side view of the wheel unit 1 when viewed from the input side. FIG. 4 is an exploded perspective view of the wheel unit 1.

The wheel unit 1 is preferably mounted, for example, in a self-propelled cleaning robot which is a domestic electric appliance, and is preferably used as a unit that allows the cleaning robot to travel. As illustrated in FIGS. 2 to 4, the wheel unit 1 of this preferred embodiment preferably includes a motor 2, a pinion gear 3, a speed reduction mechanism 4, a final gear 5, a wheel 6, and a gear case 7. When the motor 2 is driven, drive force of the motor 2 is transmitted to the wheel 6 via the pinion gear 3, the speed reduction mechanism 4, and the final gear 5. Accordingly, the wheel 6 rotates.

In the motor 2 of this preferred embodiment, a brushless DC motor is preferably used, however, any other desirable type of motor could be used. The motor 2 preferably includes a stationary portion 21 which is fixed to the gear case and a rotating portion 22 which rotates relative to the stationary portion 21. As indicated by broken dashed line in FIG. 3, the stationary portion 21 preferably includes an armature 211 defined by a stator core and coils. On the other hand, the rotating portion 22 preferably includes an annular magnet 221. When drive current flows through the coils of the armature 211, a magnetic flux is generated in the stator core. In addition, the rotating portion 22 is rotated by magnetic action between the armature 211 and the magnet 221.

The motor 2 of this preferred embodiment is preferably a so-called outer rotor type motor in which the magnet 221 is disposed on the outside of the armature 211. In the outer rotor type motor, a magnet having a larger diameter than that of an inner rotor type motor can be used. Therefore, while an increase in the dimensions of the magnet in the axial direction is avoided as much as possible, high output is obtained. Accordingly, when the outer rotor type motor is used, the dimensions of the motor 2 in the axial direction are reduced. Otherwise, even in a case where the volume of the magnet is further increased to increase the output, the increase in the dimensions in the axial direction is prevented or significantly reduced. For example, the dimensions of the motor 2 in the axial direction is preferably smaller than the diameter of the rotating portion 22 of the motor 2. As a result, when viewed in the axial direction, a small wheel unit 1 is provided.

Figure 5:
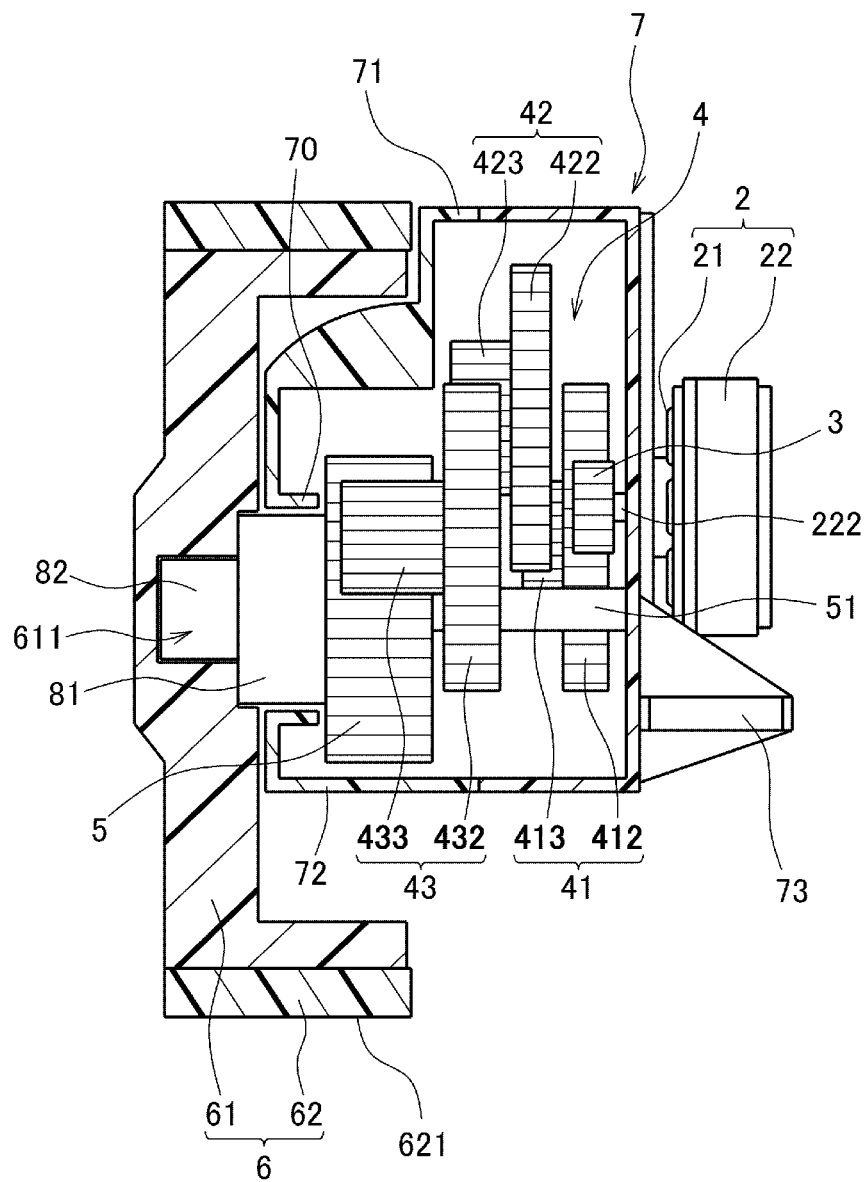
FIG. 5 is a front view of the wheel unit according to the second preferred embodiment of the present invention, which is partially cut-away for illustration purposes.
Figure 6:
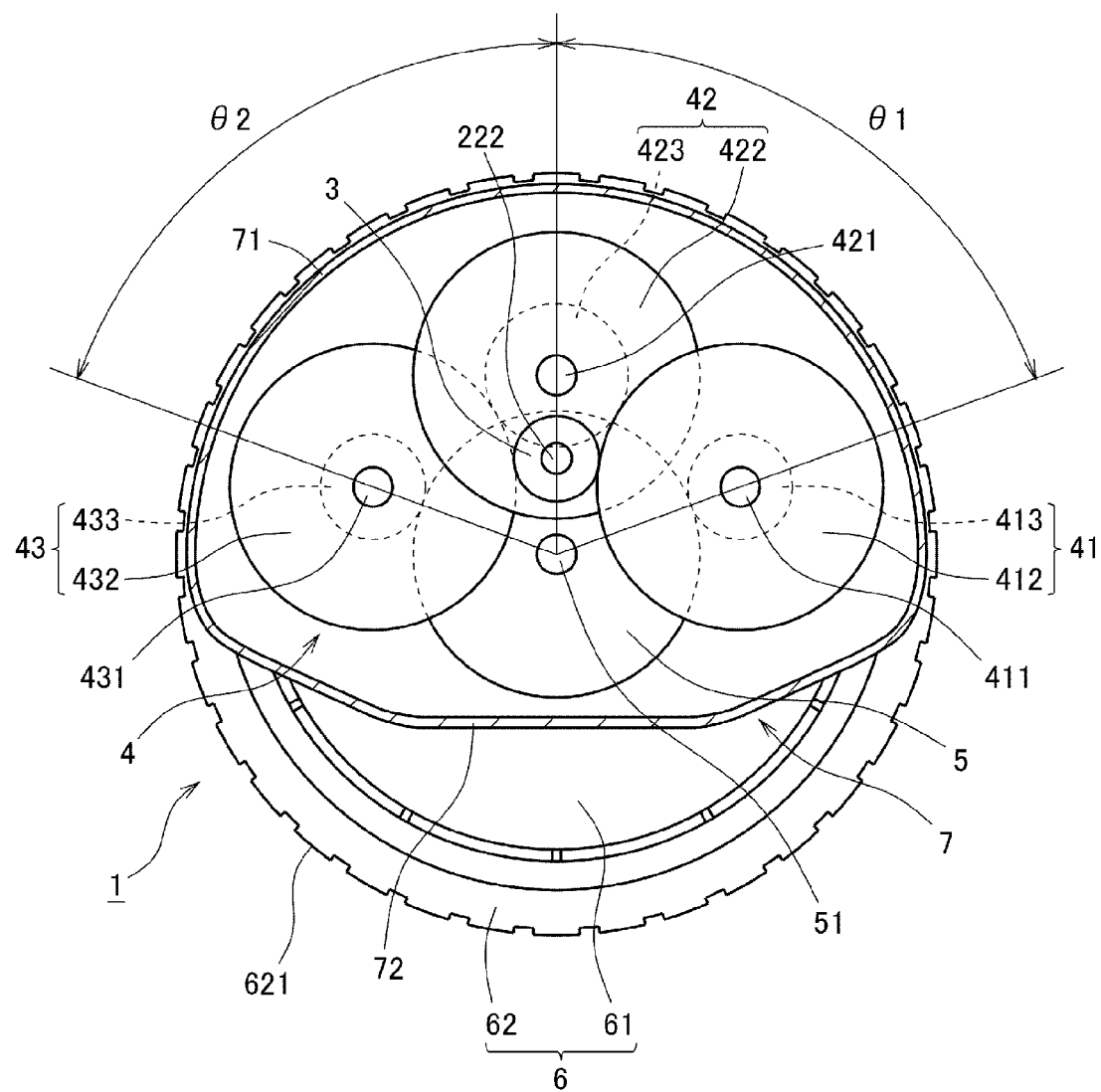
FIG. 6 is a side view of the wheel unit according to the second preferred embodiment of the present invention, which is partially cut-away for illustration purposes.

Subsequently, the inner structure of the gear case 7 will be described. FIG. 5 is a front view of the wheel unit 1, in which the wheel 6 and the gear case 7 are cut-away for illustration purposes. FIG. 6 is a side view of the wheel unit 1, in which the gear case 7 is cut away for illustration purposes. As illustrated in FIGS. 4 to 6, in the inner portion of the gear case 7, the pinion gear 3, the speed reduction mechanism 4, and the final gear 5 are arranged.

The rotating portion 22 of the motor 2 rotates along with a motor shaft 222 which extends in the axial direction. An end portion of the motor shaft 222 on the output side extends to the inner portion of the gear case 7. In addition, the pinion gear 3 is preferably fixed to the end portion of the motor shaft 222. The pinion gear 3 is preferably made of a resin material such as, for example, a POM (polyacetal) or a metal. The pinion gear 3 includes a plurality of teeth which mesh with a first large-diameter gear portion 412, which will be described later.

The speed reduction mechanism 4 preferably includes a first composite gear 41, a second composite gear 42, and a third composite gear 43. The first composite gear 41 is rotatably supported by a first support shaft 411 which extends in the axial direction. The second composite gear 42 is preferably rotatably supported by a second support shaft 421 which extends in the axial direction. The third composite gear 43 is preferably rotatably supported by a third support shaft 431 which extends in the axial direction. All of the first support shaft 411, the second support shaft 421, and the third support shaft 431 are fixed to the gear case 7 so as not to rotate.

The first composite gear 41 preferably includes the first large-diameter gear portion 412 and a first small-diameter gear portion 413 which is positioned closer to the output side than the first large-diameter gear portion 412 and has a smaller diameter than that of the first large-diameter gear portion 412. The first large-diameter gear portion 412 rotates while a plurality of teeth thereof mesh with a plurality of teeth of the pinion gear 3. However, the number of teeth of the first large-diameter gear portion 412 is preferably greater than the number of teeth of the pinion gear 3. Therefore, the first composite gear 41 rotates at a lower rotation frequency than the pinion gear 3.

The second composite gear 42 preferably includes a second large-diameter gear portion 422 and a second small-diameter gear portion 423 which is positioned closer to the output side than the second large-diameter gear portion 422 and has a smaller diameter than that of the second large-diameter gear portion 422. The second large-diameter gear portion 422 rotates while a plurality of teeth thereof mesh with a plurality of teeth of the first small-diameter gear portion 413. However, the number of teeth of the second large-diameter gear portion 422 is preferably greater than the number of teeth of the first small-diameter gear portion 413. Therefore, the second composite gear 42 rotates at a lower rotation frequency than the first composite gear 41.

The third composite gear 43 preferably includes a third large-diameter gear portion 432 and a third small-diameter gear portion 433 which is positioned closer to the output side than the third large-diameter gear portion 432 and has a smaller diameter than that of the third large-diameter gear portion 432. The third large-diameter gear portion 432 rotates while a plurality of teeth thereof mesh with a plurality of teeth of the second small-diameter gear portion 423. However, the number of teeth of the third large-diameter gear portion 432 is preferably greater than the number of teeth of the second small-diameter gear portion 423. Therefore, the third composite gear 43 rotates at a lower rotation frequency than the second composite gear 42.

The final gear 5 is preferably rotatably supported by a final gear support shaft 51 which extends in the axial direction. The final gear support shaft 51 is fixed to the gear case 7 so as not to rotate. The final gear 5 rotates while a plurality of teeth thereof mesh with a plurality of teeth of the third small-diameter gear portion 433. However, the number of teeth of the final gear 5 is preferably greater than the number of teeth of the third small-diameter gear portion 433. Therefore, the final gear 5 rotates at a lower rotation frequency than the third composite gear 43.

In this manner, the drive force of the motor 2 is transmitted from the pinion gear 3 to the final gear 5 via the first composite gear 41, the second composite gear 42, and the third composite gear 43. As described above, the rotation frequency is reduced through the plurality of gears. On the other hand, torque is increased through the plurality of gears. That is, the speed reduction mechanism 4 plays a role of reducing the rotation frequency and transmitting power from the pinion gear 3 to the final gear 5 while increasing the torque.

The first composite gear 41, the second composite gear 42, the third composite gear 43, and the final gear 5 are preferably made of, for example, a resin such as POM (polyacetal). However, the first composite gear 41, the second composite gear 42, and the third composite gear 43 may alternatively be made of a metal if so desired.

At a position of the final gear 5 adjacent to the output side, a rotation support portion 81 which rotates while being supported by the gear case 7 is preferably provided. The rotation support portion 81 is positioned between the final gear 5 and a wheel portion 61, which will be described later, and is supported by a circular hole portion 70 provided in a side wall of the gear case 7. The rotation support portion 81 has a cylindrical outer peripheral surface which is disposed coaxially or substantially coaxially with the final gear support shaft 51. The rotation support portion 81 rotates while the outer peripheral surface thereof comes into contact with an edge of the circular hole portion 70 of the gear case 7. That is, in this preferred embodiment, a slide bearing is configured by the outer peripheral surface of the rotation support portion 81 and the circular hole portion 70 of the gear case 7. Between the outer peripheral surface of the rotation support portion 81 and the circular hole portion 70 of the gear case 7, a lubricant such as, for example, a grease may be interposed.

In addition, at a position of the rotation support portion 81 adjacent to the output side, a polygonal column-shaped key portion 82 which extends in the axial direction is provided. In this preferred embodiment, the final gear 5, the rotation support portion 81, and the key portion 82 are preferably defined by a single monolithic molded product made of a resin such as POM (polyacetal). Accordingly, the number of components is reduced, and thus assembly of the wheel unit 1 is facilitated. However, the final gear, the rotation support portion, and the key portion may alternatively be prepared as separate members to be fixed to each other, if so desired.

The wheel 6 preferably includes the wheel portion 61 made of, for example, a resin or a metal and a tire portion 62 made of, for example, a rubber or a resin other than the rubber. The wheel portion 61 extends in a radial direction with respect to the final gear support shaft 51. The tire portion 62 is fixed to the outer peripheral portion of the wheel portion 61. The tire portion 62 preferably includes an annular ground surface 621 which has a constant or substantially constant width. At the center of the wheel portion 61, a key groove 611 which is open toward the input side is provided. The key portion 82 is fitted into the key groove 611 to be fixed. Accordingly, when the final gear 5 rotates, the rotation support portion 81, the key portion 82, the wheel portion 61, and the tire portion 62 integrally rotate about the final gear support shaft 51.

As illustrated in FIG. 5, the wheel portion 61 of the wheel 6 is provided in or substantially in a cup shape which is open toward the input side. Therefore, a surface of the wheel portion 61 on the input side is a recessed surface which is further recessed toward the output side than an end portion of the tire portion 62 on the input side. In addition, in the inner portion of the wheel portion 61, the final gear 5 is preferably partially accommodated. That is, in this preferred embodiment, a portion of the final gear 5 is positioned on the inside of the cylindrical or substantially cylindrical area surrounded by the ground surface 621 of the wheel 6. Accordingly, the end portion of the final gear 5 on the output side is positioned closer to the output side than the end portion of the tire portion 62 on the input side. In this case, the dimensions of the wheel unit 1 in the axial direction become smaller than those in a case where the entire final gear 5 is disposed on the outside of the wheel 6.

In addition, in this preferred embodiment, when the wheel unit 1 is viewed in the axial direction as illustrated in FIG. 6, all of the pinion gear 3, the three composite gears 41 to 43, and the final gear 5 are preferably arranged on the inside of the ground surface 621 of the wheel 6. That is, on the inside of the cylindrical surface on which the ground surface 621 of the wheel 6 is projected in the axial direction, the pinion gear 3, the three composite gears 41 to 43, and the final gear 5 are arranged. Accordingly, in a direction orthogonal to the axial direction, the area occupied by the wheel unit 1 is reduced.

In addition, as illustrated in FIG. 6, in this preferred embodiment, the first support shaft 411 that supports the first composite gear 41, the second support shaft 421 that supports the second composite gear 42, and the third support shaft 431 that supports the third composite gear 43 are arranged about the final gear support shaft 51 in a circumferential or substantially circumferential direction. The three composite gears 41 to 43 are preferably arranged in a spiral pattern about the final gear support shaft 51. In this arrangement, the plurality of gears are compactly arranged while also preventing each gear from coming into contact with the support shafts of the other gears.

In addition, as illustrated in FIG. 6, in this preferred embodiment, an angle $\theta 1$ between the first support shaft 411 and the second support shaft 421 with respect to the final gear support shaft 51 and an angle $\theta 2$ between the second support shaft 421 and the third support shaft 431 with respect to the final gear support shaft 51 are preferably about 90° or less. Accordingly, all of the three composite gears 41 to 43 can be arranged at positions biased toward one direction with respect to the final gear 5. In this preferred embodiment, all of the three composite gears 41 to 43 are arranged at higher positions than the final gear 5. As a result, the arrangement of the plurality of gears becomes more compact.

When the wheel unit 1 mounted in a cleaning robot is reduced in size, the degree of freedom for a design of parts of the cleaning robot is increased. For example, by using a lager battery, dust box, or suction blower in the cleaning robot, the performance of the cleaning robot can be improved. In addition, the cleaning robot can be reduced in size while maintaining the sizes of the battery, the dust box, the suction blower, and the like. When the size of the cleaning robot is reduced, power consumption is suppressed, and a narrower gap can be cleaned.

The gear case 7 preferably includes an arc-shaped or substantially arc-shaped upper portion 71 and a flat bottom portion 72 which extends in a horizontal or substantially horizontal direction. When viewed in the axial direction as in FIG. 6, the upper portion 71 of the gear case 7 is preferably positioned slightly inward from the ground surface 621 of the wheel 6, and extends in the arc shape along the ground surface 621. On the other hand, the bottom portion 72 of the gear case 7 is preferably disposed at a high position closer to the lower side of the final gear 5. Accordingly, the gear case 7 is disposed at a position biased toward the upper side with respect to the wheel 6. In addition, a space with no member being disposed therein is ensured between the bottom portion 72 of the gear case 7 and the ground. Accordingly, contact between the gear case 7 and the ground during traveling is less likely to occur.

In addition, the gear case 7 of this preferred embodiment preferably includes a plate-shaped rib 73 which protrudes in the axial direction from the surface in the vicinity of the bottom portion 72 on the input side. In addition, the motor 2 is disposed above the rib 73. When the wheel unit 1 of this preferred embodiment is attached to the cleaning robot, the rib 73 is fixed to a frame body of the cleaning robot by a screw or the like, for example.

When viewed in the axial direction as in FIGS. 3 and 6, the gear case 7 of this preferred embodiment does not protrude in a specific direction from the ground surface of the wheel 6. Therefore, the wheel units 1 having the same structure can be reversely arranged on the left and the right of the cleaning robot. There is no need to change the design of the wheel unit 1 on the left side and the right side of the cleaning robot, and thus the number of manufacturing processes and the manufacturing cost of the cleaning robot are reduced.

In addition, in this preferred embodiment, the diameters of all of the small-diameter gear portions 413, 423, and 433 of the three composite gears 41 to 43 are preferably smaller than the diameter of the rotating portion 22 of the motor 2. In addition, in this preferred embodiment, the sum of the diameter of any of the large-diameter gear portions 412, 422, and 432 of the three composite gears 41 to 43 and the diameter of the final gear 5 is preferably greater than the radius of the ground surface 621 of the wheel 6. When the diameter of the rotating portion 22 of the motor 2 is large, high torque can be generated by using the magnet 221 having a large diameter. On the other hand, when the diameters of the large-diameter gear portions 412, 422, and 432 are large and the diameters of the small-diameter gear portions 413, 423, and 433 are small, a reduction gear ratio of the speed reduction mechanism 4 is increased. Accordingly, the torque is further increased.

In addition, even in a case where the composite gears to 43 are made of a resin, when the diameters of the composite gears 41 to 43 are designed to be large, high durability can be obtained.

As described above, in the wheel unit 1, the portion of the final gear 5 is positioned on the inside of the cylindrical or substantially cylindrical area surrounded by the ground surface 621 of the wheel 6. This structure is excellent because the dimensions of the wheel unit 1 in the axial direction can be reduced, but has a problem in that it is difficult for the support structure of the rotation support portion 81 with respect to the gear case 7 to be widened in the axial direction.

Considering this, in the wheel unit 1, the outside diameter of the rotation support portion 81 is greater than the outside diameter of the final gear support shaft 51. Accordingly, a large contact portion between the rotation support portion 81 and the circular hole portion 70 of the gear case 7 can be obtained. Therefore, a surface pressure in a sliding portion of the outer peripheral surface of the rotation support portion 81 and the circular hole portion 70 of the gear case 7 is preferably reduced, and the wear of the sliding portion is further reduced. As a result, in the support structure of the rotation support portion 81 with respect to the gear case 7, high durability is obtained.

Third Preferred Embodiment

Subsequently, a wheel unit 1B according to a third preferred embodiment of the present invention will be described with a focus on the differences from the second preferred embodiment.

Figure 7:
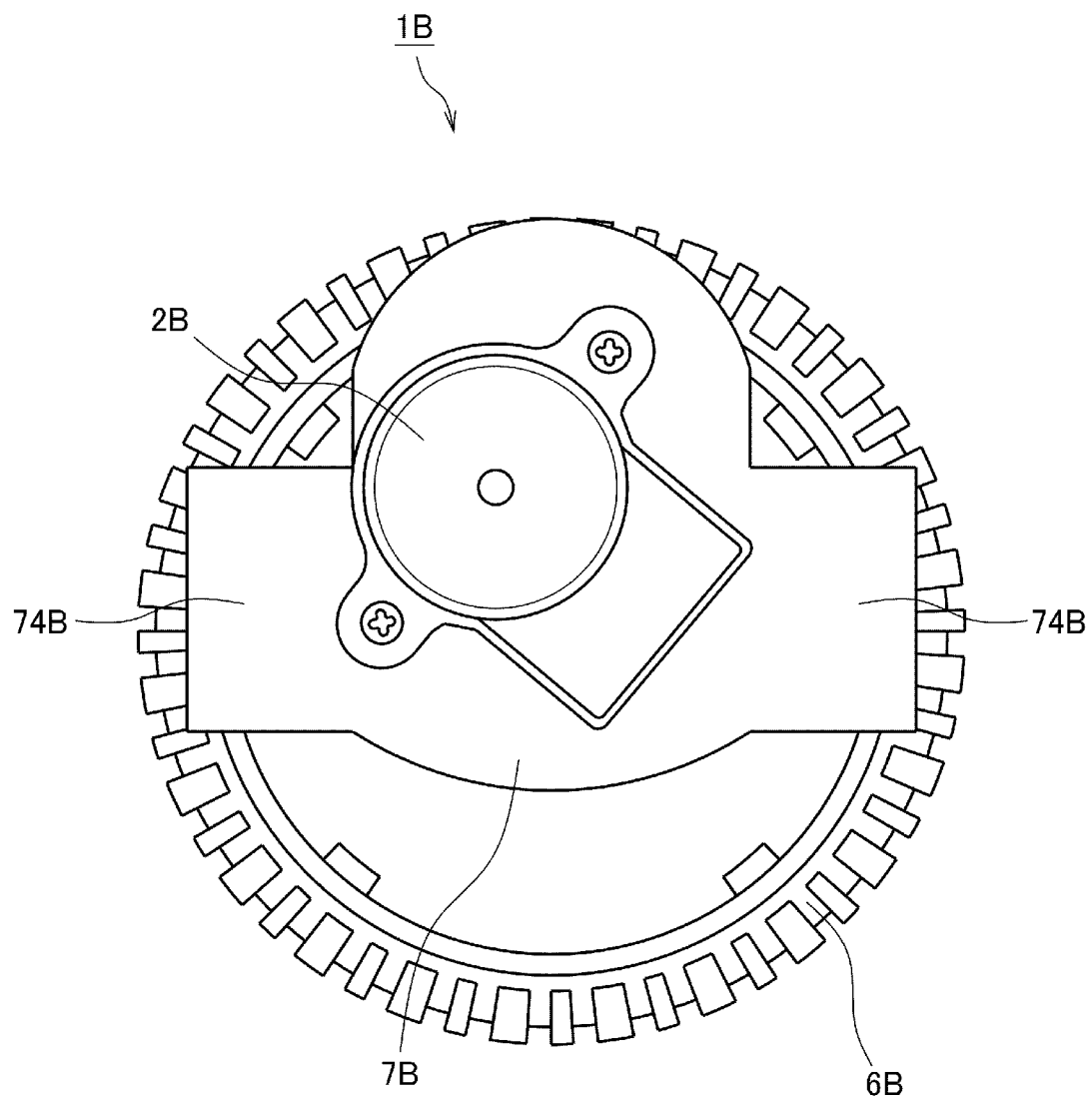
FIG. 7 is a side view of a wheel unit according to a third preferred embodiment of the present invention.
Figure 8:
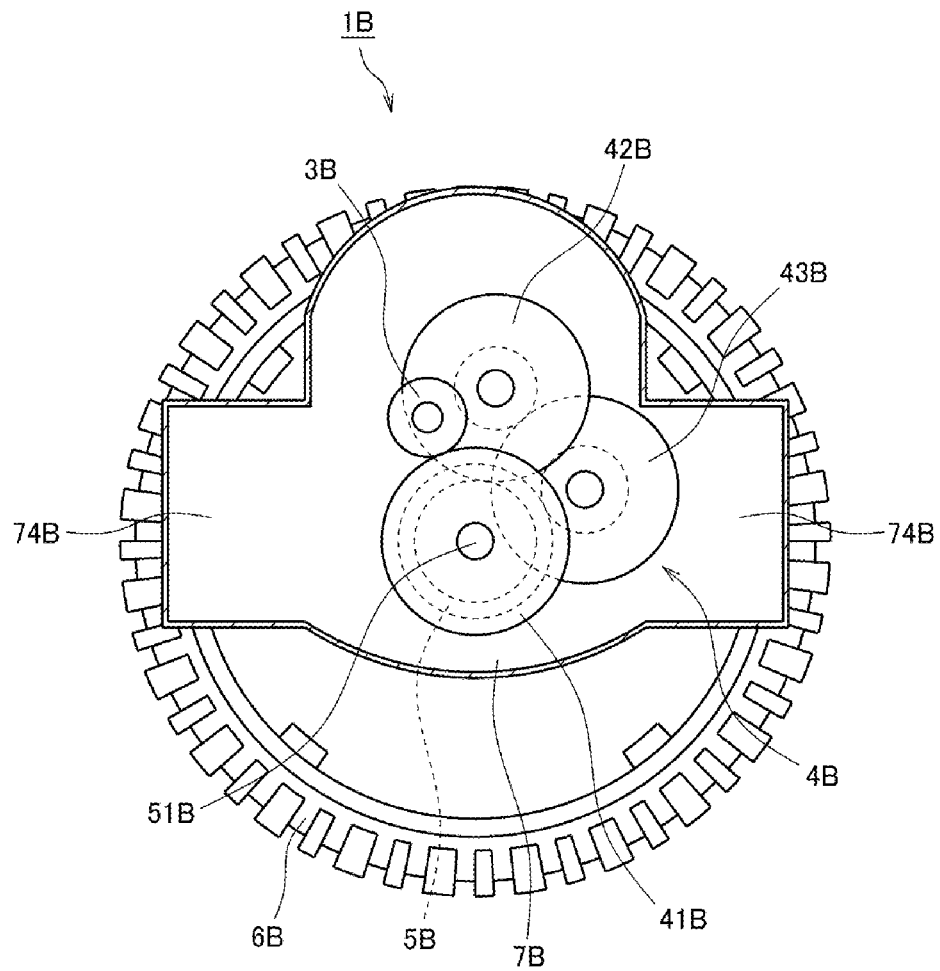
FIG. 8 is a side view of the wheel unit according to the third preferred embodiment of the present invention, which is partially cut-away for illustration purposes.

FIG. 7 is a side view of the wheel unit 1B according to the third preferred embodiment. FIG. 8 is a side view of the wheel unit 1B, in which a gear case 7B is cut-away for illustration purposes. Similarly to the second preferred embodiment, the wheel unit 1B preferably includes a motor 2B, a pinion gear 3B, a speed reduction mechanism 4B, a final gear 5B, a wheel 6B, and the gear case 7B. When the motor 2B is driven, the drive force of the motor 2B is transmitted to the wheel 6B via the pinion gear 3B, the speed reduction mechanism 4B, and the final gear 5B. Accordingly, the wheel 6B is rotated.

As illustrated in FIG. 8, in this preferred embodiment, among three composite gears 41B to 43B defining the speed reduction mechanism 4B, the first composite gear 41B is preferably supported by a final gear support shaft 51B which supports the final gear 5B. That is, the first composite gear 41B and the final gear 5B are supported by the common final gear support shaft 51B. The final gear support shaft 51B is fixed to the gear case 7B so as not to rotate. The first composite gear 41B and the final gear 5B preferably independently rotate about the final gear support shaft 51B.

In this manner, when the support shaft of at least one composite gear included in the speed reduction mechanism and the support shaft of the final gear are used in common, the plurality of gears are more compactly arranged in the inner portion of the gear case 7.

Figure 9:
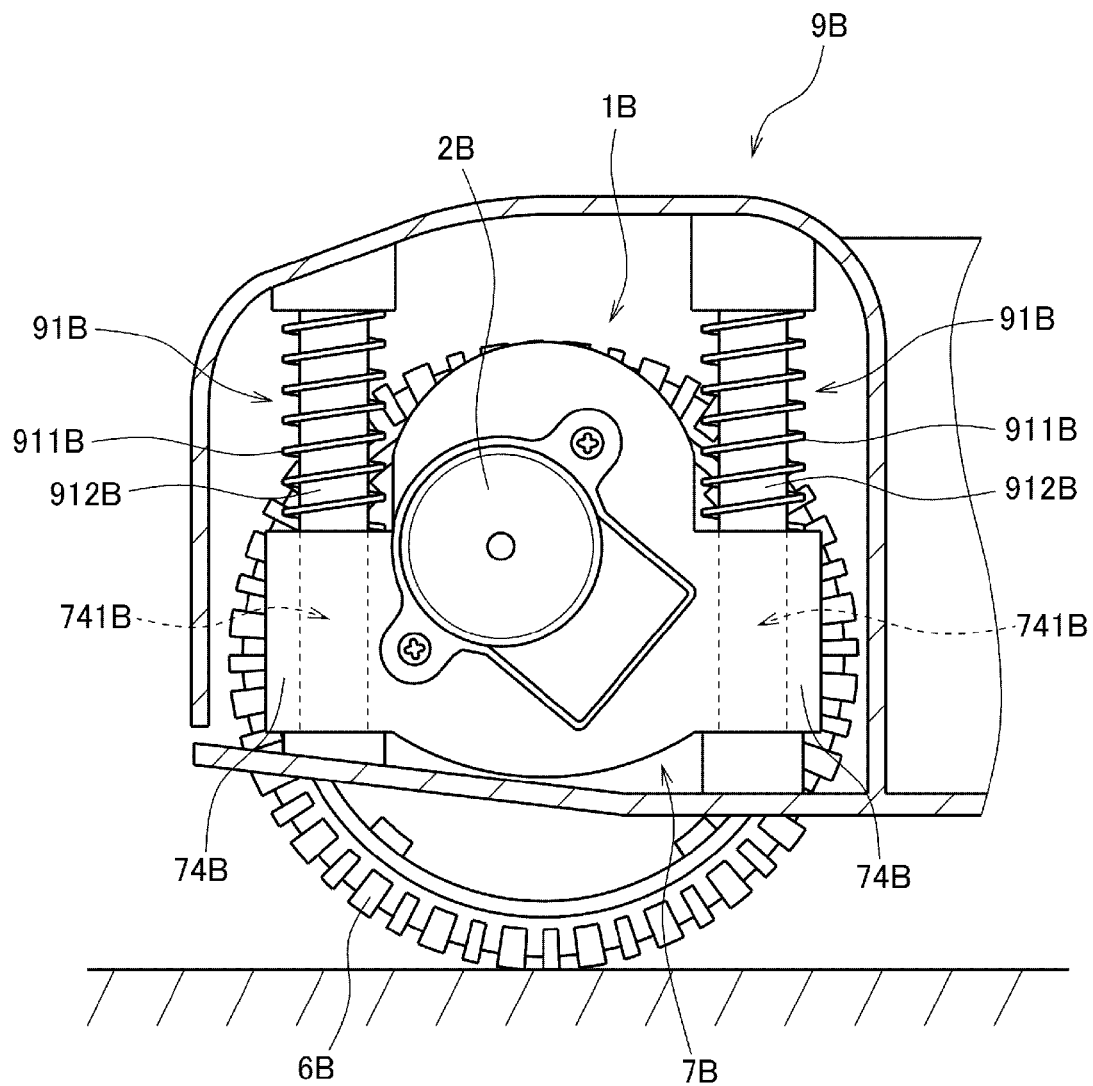
FIG. 9 is a side view of the wheel unit according to the third preferred embodiment of the present invention, which is attached to a cleaning robot.
Figure 10:
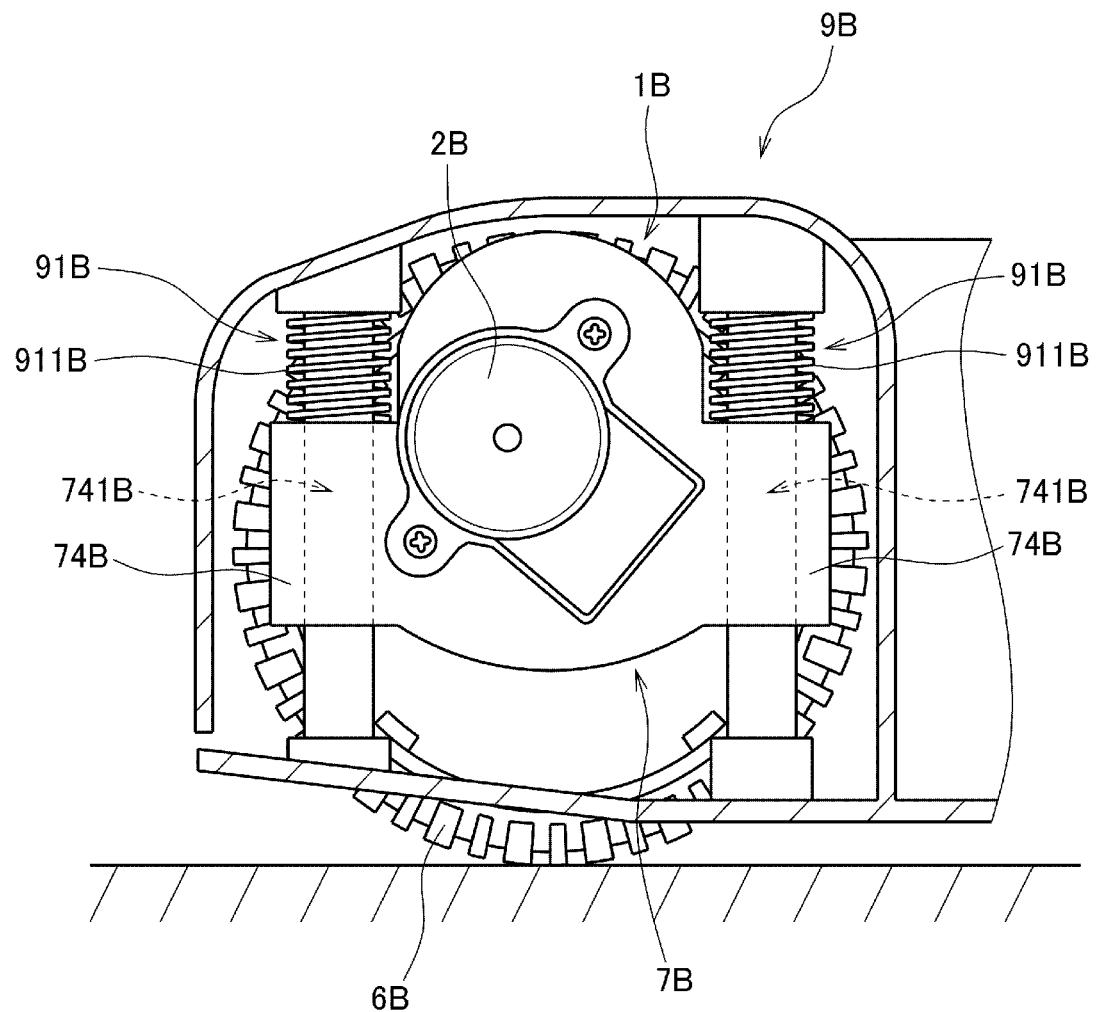
FIG. 10 is a side view of the wheel unit according to the third preferred embodiment of the present invention, which is attached to the cleaning robot.

FIGS. 9 and 10 are side views of the wheel unit 1B attached to a cleaning robot 9B. The cleaning robot 9B preferably includes a pair of suspension mechanisms 91B which impel the wheel unit 1B toward the lower side. The pair of suspension mechanisms 91B are arranged in the movement direction. Each of the suspension mechanism 91B includes an elastic member 911B which elongates and contracts vertically.

The gear case 7B preferably includes a pair of receiving portions 74B which protrude forward in the movement direction and rearward in the movement direction. Lower end portions of the pair of elastic members 911B abut on the upper surfaces of the receiving portions 74B. In addition, through-holes 741B that extend vertically are preferably defined in the pair of receiving portions 74B. A guide shaft 912B that extends vertically is inserted into the through-hole 741B.

During the traveling of the cleaning robot 9B, the pair of elastic members 911B elastically elongate and contract in response to an external force. Therefore, the wheel unit 1B is vertically moved relative to the frame body of the cleaning robot 9B. Accordingly, the cleaning robot 9B stably travels on ground having unevenness.

In this preferred embodiment, the plurality of gears are arranged so that the speed reduction mechanism 4B and the final gear 5B which are arranged in the inner portion of the gear case 7B and the through-hole 741B of the receiving portion 74B do not overlap each other. That is, as described above, the first composite gear 41B and the final gear 5B are supported by the common final gear support shaft 51B. In addition, the first composite gear 41B and the second composite gear 42B are preferably arranged in or substantially in the vertical direction. As a result, the dimensions of both the speed reduction mechanism 4B and the final gear 5B in the movement direction are reduced. Accordingly, the speed reduction mechanism 4B, the final gear 5B, and the through-hole 741B of the receiving portion 74B are preferably arranged without overlapping each other.

In this preferred embodiment, the suspension mechanisms 91B are preferably defined by the pairs of receiving portions 74B included in the wheel unit 1B, and the elastic members 911B and the guide shafts 912B provided in the cleaning robot 9B. However, by assembling the elastic members and the guide shafts into the wheel unit, the wheel unit itself may include the complete suspension mechanisms.

Fourth Preferred Embodiment

Figure 12:
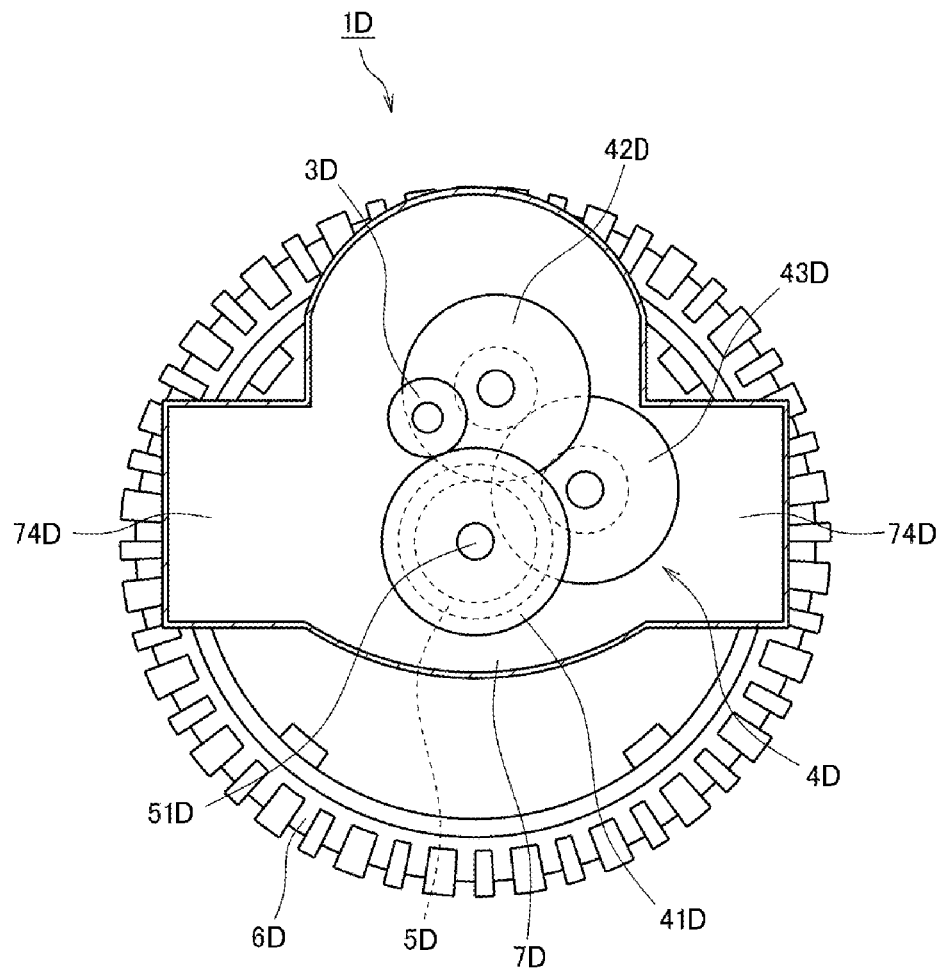
FIG. 12 is a side view of a wheel unit according to a fourth preferred embodiment of the present invention.
Figure 13:
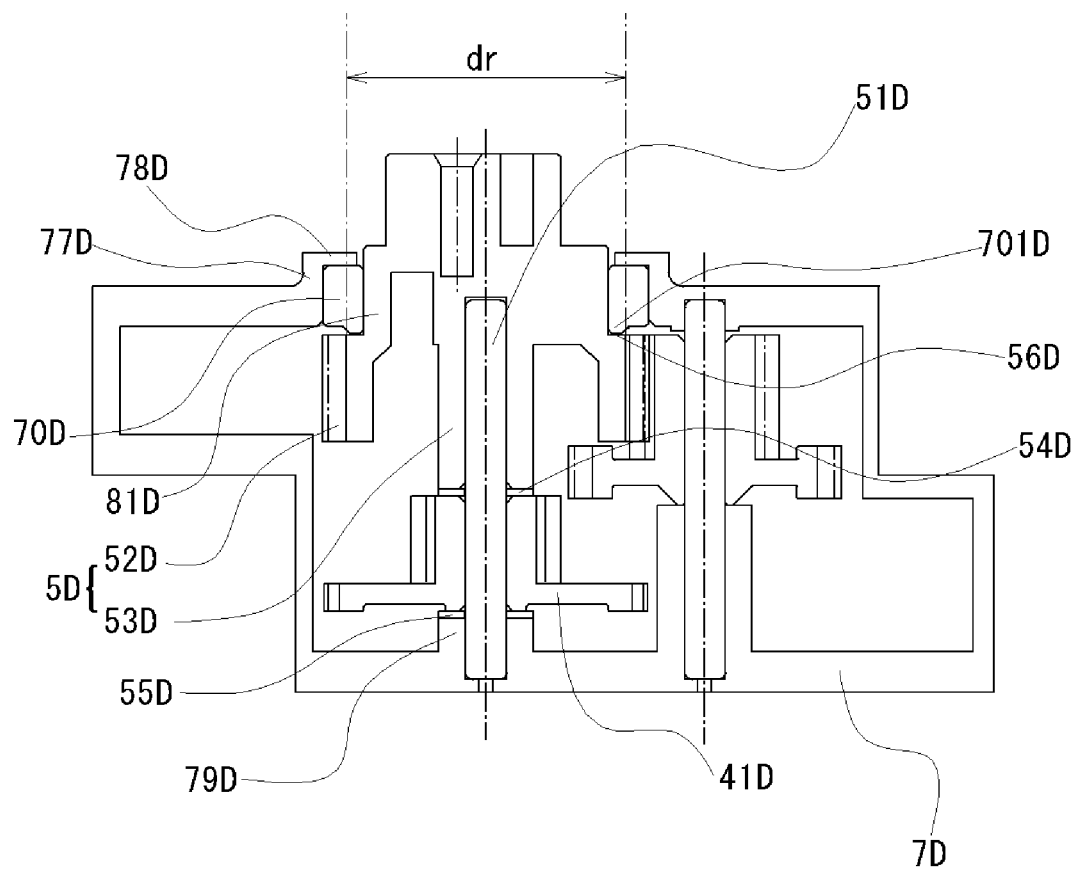
FIG. 13 is a cross-sectional view of the wheel unit according to the fourth preferred embodiment of the present invention, which is partially cut-away for illustration purposes.

FIG. 12 is a side view of a wheel unit 1D according to a fourth preferred embodiment of the present invention. FIG. 13 is a cross-sectional view of the wheel unit 1D viewed in a case where a gear case 7D is cut-away in a plane including a final gear support shaft 51D and the center of a second gear support shaft for illustration purposes. The wheel unit 1D preferably includes a motor (not shown), a pinion gear 3D, a speed reduction mechanism 4D, a final gear 5D, a wheel 6D, and a gear case 7D, and a rotation support portion 81D is provided between the final gear 5D and the wheel 6D. When the motor 2D is driven, the drive force of the motor 2D is transmitted to the wheel 6D via the pinion gear 3D, the speed reduction mechanism 4D, and the final gear 5D. Accordingly, the wheel 6D is rotated.

As illustrated in FIG. 13, in this preferred embodiment, among three composite gears 41D to 43D defining the speed reduction mechanism 4D, the first composite gear 41D is preferably supported by the final gear support shaft 51D which supports the final gear 5D. That is, the first composite gear 41D and the final gear 5D are preferably supported by the common final gear support shaft 51D. The final gear support shaft 51D is preferably supported by a final gear support shaft support portion 54D so as not to rotate with respect to the gear case 7D. The first composite gear 41D and the final gear 5D rotate about the final gear support shaft 51D at different speeds.

Accordingly, when the support shaft of at least one composite gear included in the speed reduction mechanism and the support shaft of the final gear are used in common, the plurality of gears are further compactly arranged in the inner portion of the gear case 7D.

The gear case 7D preferably includes an annular sleeve member 70D, a sleeve holding portion 77D which preferably includes a cylindrical inner peripheral surface, and an annular stopper plate portion 78D which extends inward in the radial direction over the inner peripheral surface. The sleeve member 70D is preferably disposed coaxially with the final gear support shaft 51D, and the outer peripheral surface of the sleeve member 70D comes into contact with the inner peripheral surface of the sleeve holding portion 77D and a surface of the stopper plate portion 78D on the output side. In this configuration, the sleeve member 70D is further stably held.

At a position of the final gear 5D adjacent to the output side, the rotation support portion 81D which rotates while being supported by the gear case 7D is preferably provided. The rotation support portion 81D is positioned between the final gear 5D and the wheel 6D, and the inner peripheral surface of the sleeve member 70D comes into contact with the outer peripheral surface of the rotation support portion 81D with a lubricant interposed therebetween.

In addition, the outside diameter of the rotation support portion 81D is preferably greater than the outside diameter of the final gear support shaft 51D. In this configuration, a large contact portion of the rotation support portion 81D and the sleeve member 70D is ensured. As a result, a surface pressure in a sliding portion of the outer peripheral surface of the rotation support portion 81D and the circular hole portion 70D of the gear case 7 is reduced, and the wear of the sliding portion is further reduced. As a result, the wear is reduced, and in the support structure of the rotation support portion 81D, good durability is obtained.

The final gear 5D and the rotation support portion 81D are preferably portions of a single monolithic member made of a continuous material, and are molded by a resin injection molding method, for example. In this case, the number of components is reduced, and thus assembly of the wheel unit 1D is facilitated.

The final gear 5D includes outer teeth 52D in which a plurality of teeth are aligned in a peripheral direction and an inner cylindrical portion 53D which is cylindrical and is disposed on the inside of the outer teeth 52D in the radial direction. An end portion of the inner cylindrical portion 53D on the input side is positioned closer to the input side than an end portion of the outer teeth 52D on the input side. The final gear support shaft 51D is accommodated on the inside of the inner cylindrical portion 53D in the radial direction, and a gap is provided between an end portion of the final gear support shaft 51D is on the output side and the inner cylindrical portion 53D.

In addition, a tooth root diameter (dr in FIG. 13) of the final gear 5D is preferably greater than the outside diameter of the rotation support portion 81D. Furthermore, the outer peripheral surface of the sleeve member 70D is preferably larger than the tooth root diameter. In this configuration, the final gear 5D is less likely to come into contact with the gear case 7D. In addition, this configuration is also effective in ensuring a place for disposing a sleeve contact surface 56D, which will be described later.

An end surface of the sleeve member 70D on the input side preferably includes an annular convex portion 701D. The annular convex portion 701D can come into contact with the sleeve contact surface 56D which is provided on the output side of the final gear 5D. That is, the dimensions of each portion of the final gear 5D and the first composite gear 41D are expected to have "play", and in a state where the gears are pressed from the other side in the axial direction, that is, from the upper side of the figure, the annular convex portion 701D comes into contact with the sleeve contact surface 56D. However, since the shape of the contact portion is convex and the contact area is small, a frictional force due to the contact is relatively small.

In addition, in the claims of the present invention, the expression "come into contact" is used, but actually means "be in a state capable of coming into contact" as described above. Bearings always have a certain degree of play, and each portion of the gears is moved in a range of the play such that each portion can be in a state of coming into contact with or in a state of not coming into contact with adjacent members. However, in such a case, each portion of the gear mechanisms needs to be designed and manufactured on the premise that the portions thereof can come into contact with each other. Therefore, although it cannot be said that portions come into contact with each other when they have a dimensional relationship in which they actually can come into contact with each other, in the descriptions of preferred embodiments of the present invention, in a case where the portions can come into contact with each other in the range of the play of the bearings, the expressions "come into contact" and "be in contact" are used.

In addition, an annular first thrust washer 54D which surrounds the final gear support shaft 51D is interposed between the end portion of the inner cylindrical portion 53D on the output side and the end portion of the first composite gear 41D on the output side in the axial direction. In this configuration, wear due to the contact between the final gear 51D and the first composite gear 41D, which rotate at different speeds, is significantly reduced.

The final gear support shaft support portion 79D is preferably provided in the gear case 7D, and the final gear support shaft 51D is supported by the final gear support shaft support portion 79D. The upper end of the final gear support shaft 51D is positioned between the sleeve holding portion 77D and the upper end and the lower end of the sleeve member 70D in the axial direction. With this unique configuration, the upper end of the final gear support shaft 51D is indirectly supported by the sleeve holding portion 77D. Therefore, although the upper end is a free end, the final gear support shaft 51D is stably held by the gear case 7D.

In addition, between the final gear support shaft support portion 79D and the end portion of the first composite gear 41D on the input side, an annular second thrust washer 55D which surrounds the final gear support shaft 51D is preferably interposed. In the configuration, wear due to the contact between the gear case 7D and the first composite gear 41D is significantly reduced.

Modified Example of a Preferred Embodiment

While the exemplary preferred embodiments of the present invention have been described above, the present invention is not limited to the above-described preferred embodiments.

Figure 11:
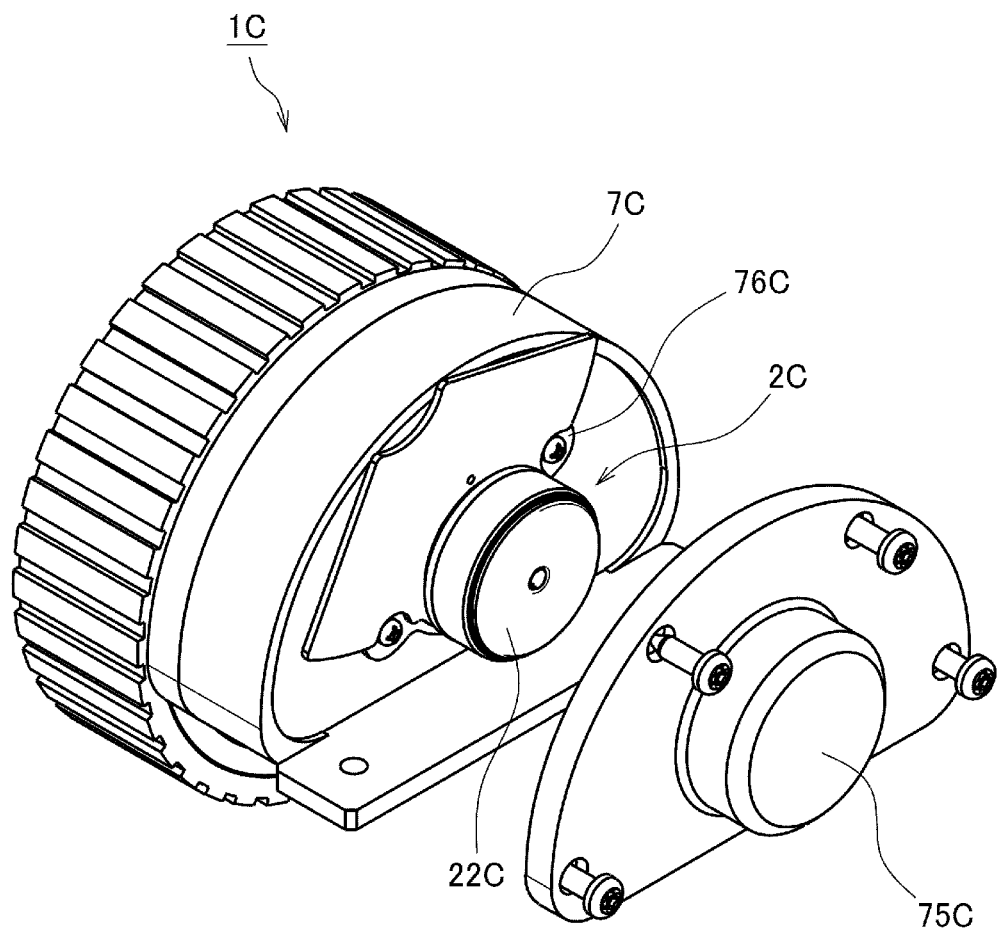
FIG. 11 is a perspective view of a wheel unit according to a modified example of a preferred embodiment of the present invention.

For example, as a wheel unit 1C of FIG. 11, a motor cover 75C which accommodate a motor 2C may be attached to a gear case 7C. In this example, the motor 2C is preferably fixed to an attachment plate 76C which is a partition wall interposed between the gear case 7C and the motor cover 75C. Accordingly, the motor 2C is firmly fixed to the gear case 7C. In addition, a rotating portion 22C of the motor 2C is reliably prevented from coming into contact with another member in the cleaning robot, waste from the outside, or a person.

The number of composite gears included in the speed reduction mechanism may be three as in the above preferred embodiments, and may alternatively be two or four or more. However, in order to obtain high torque while using a small motor, three or more composite gears may be used. In addition, a large-diameter gear portion and a small-diameter gear portion of the composite gear may be prepared as separate members and be fixed to each other.

The support shaft of each composite gear may be supported to rotate relative to the gear case. In this case, the support shaft and the composite gear may be fixed to each other so that the composite gear rotates along with the support shaft. In addition, the final gear support shaft may be supported to rotate relative to the gear case. In this case, the final gear support shaft, the final gear, the rotation support portion, and the wheel may be fixed so that the final gear, the rotation support portion, and the wheel rotate along with the final gear support shaft.

In order to reduce the dimensions of the wheel unit in the axial direction, on the inside of the cylindrical or substantially cylindrical area surrounded by the ground surface of the wheel, at least a portion of the final gear may be disposed. The entire final gear may be disposed on the inside of the area. In addition, not only the final gear, but also the composite gear may be disposed on the inside of the area.

The support structure of the rotation support portion with respect to the gear case may be a bearing structure other than the slide bearing. For example, between the rotation support portion and the circular hole portion of the gear case, a ball bearing may be provided. However, as in the above preferred embodiments, when the slide bearing is used, the support structure of the rotation support portion with respect to the gear case is realized with a smaller number of components.

The bottom surface of the gear case may be a flat surface as in FIG. 6, may be a curved surface as in FIG. 8, and may be any other desirable shape. However, in order to dispose the gear case at a position biased toward the upper side with respect to the wheel, the bottom surface of the gear case may be a curved surface having a larger radius of curvature than the ground surface of the wheel or a flat surface.

In addition, another member may be interposed between the members defining the final gear and the wheel. That is, the members defining the final gear may be fixed to the wheel via another member interposed therebetween.

A gap which is equal to or smaller than the play in the axial direction may be provided between the annular convex portion 701D of the sleeve member 70D and the sleeve contact surface 56D which is provided on the output side of the final gear 5D, if so desired.

In this case, since the final gear 5D is rotatably supported by the final gear support shaft 51D, movement thereof in the axial direction is possible, and according to the movement of the final gear 5D in the axial direction, the sleeve contact surface 56D may be in a state of coming into contact with the circular convex portion 701D.

In addition, considering the required size and torque, the wheel unit of the preferred embodiments of the present invention is particularly appropriate for a domestic cleaning robot, but may also be used for any other electric appliances. For example, the wheel unit may be used in a robot for conveying goods or a toy which is wirelessly controlled. In addition, indoors or outdoors, the wheel unit may be used in an electric wheelchair which travels with a person riding thereon. In addition, the wheel unit according to preferred embodiments of the present invention may be used in domestic electric appliances, and may also be used in apparatuses for business use.

In addition, elements described in the preferred embodiments and the modified example described above may be appropriately combined in a range with no contradictions.

Preferred embodiments of the present invention may be used, for example, in a wheel unit.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wheel unit, comprising:
a motor;
a pinion gear which is fixed to a rotating portion of the motor;
a wheel which includes an annular ground surface and rotates about a final gear support shaft;
a final gear made of a resin, which is fixed to the wheel directly or via another member and is disposed on one side in an axial direction with respect to the wheel;
a speed reduction mechanism which decelerates rotation of the pinion gear and transmits the rotation to the final gear; and
a gear case which accommodates the pinion gear, the speed reduction mechanism, and the final gear; wherein
a rotation support portion which rotates along with the final gear and the wheel while being supported by the gear case directly or via another member is provided between the final gear and the wheel;
an outside diameter of the rotation support portion is greater than an outside diameter of the final gear support shaft; and
at least a portion of the final gear is positioned on an inside of a cylindrical or substantially cylindrical area surrounded by the ground surface.

2. The wheel unit according to claim 1, wherein
the gear case includes an annular sleeve member which is disposed coaxially with the final gear support shaft; and
an outer peripheral surface of the rotation support portion is arranged to come into contact with an inner peripheral surface of the sleeve member with a lubricant interposed therebetween.

3. The wheel unit according to claim 2, wherein
a tooth root diameter of the final gear is greater than the outside diameter of the rotation support portion; and
an outer peripheral surface of the sleeve member is larger than the tooth root diameter.

4. The wheel unit according to claim 3, wherein
the gear case includes:
a cylindrical sleeve holding portion which surrounds the rotation support portion; and
an annular stopper plate portion which extends inward in a radial direction from a portion of the sleeve holding portion on the other side in the axial direction; wherein
the sleeve member is arranged to come into contact with an inner peripheral surface of the sleeve holding portion and a surface of the stopper plate portion on the one side in the axial direction.

5. The wheel unit according to claim 4, wherein
the sleeve member includes an annular convex portion in an end surface thereof on the one side in the axial direction;
the final gear includes an annular sleeve contact surface directed toward the other side in the axial direction; and
the annular convex portion comes into contact with the sleeve contact surface.

6. The wheel unit according to claim 1, wherein
the final gear and the rotation support portion are portions of a single monolithic rotation member made of a resin.

7. The wheel unit according to claim 6, wherein
the speed reduction mechanism includes a plurality of composite gears, each of which includes a large-diameter gear portion and a small-diameter gear portion;
an initial stage composite gear, of which the large-diameter gear portion meshes with the pinion gear, is disposed on the one side of the final gear in the axial direction;
the initial stage composite gear is supported by the final gear support shaft; and
the initial stage composite gear and the final gear are rotatable relative to the gear case.

8. The wheel unit according to claim 1, wherein
the gear case includes a circular hole portion including a cylindrical inner peripheral surface which supports the rotation support portion; and
the inner peripheral surface of the circular hole portion of the gear case comes into contact with an outer peripheral surface of the rotation support portion with a lubricant interposed therebetween.

9. The wheel unit according to claim 1, wherein
the speed reduction mechanism includes a plurality of composite gears, each of which includes a large-diameter gear portion and a small-diameter gear portion;
an initial stage composite gear, of which the large-diameter gear portion meshes with the pinion gear, is disposed on the one side of the final gear in the axial direction;
the initial stage composite gear is supported by the final gear support shaft; and
the initial stage composite gear and the final gear are rotatable relative to the gear case.

10. The wheel unit according to claim 9, wherein
the final gear includes:
outer teeth in which a plurality of teeth are aligned in a peripheral direction; and
an inner cylindrical portion which is a cylindrical portion that is disposed on an inside of the outer teeth in the radial direction and surrounds the final gear support shaft; wherein
an end portion of the inner cylindrical portion on the one side in the axial direction is positioned closer to the one side in the axial direction than an end portion of the outer teeth on the one side in the axial direction; and
an annular first thrust washer which surrounds the final gear support shaft is interposed between the end portion of the inner cylindrical portion on the one side in the axial direction and an end portion of the initial stage composite gear on the other side in the axial direction.

11. The wheel unit according to claim 10, wherein
the gear case includes a final gear support shaft support portion which supports the final gear support shaft on the one side of the initial stage composite gear in the axial direction;
an annular second thrust washer which surrounds the final gear support shaft is interposed between the final gear support shaft support portion and an end portion of the initial stage composite gear on the one side in the axial direction; and
the final gear support shaft support portion and the second thrust washer are arranged to come into contact with each other, the second thrust washer and the end portion of the initial stage composite gear on the other side in the axial direction are arranged to come into contact with each other, the end portion of the initial stage composite gear on the other side in the axial direction and the first thrust washer are arranged to come into contact with each other, and the first thrust washer and an end portion of the final gear on the one side in the axial direction are arranged to come into contact with each other.

12. The wheel unit according to claim 9, wherein
all of the plurality of composite gears are positioned on an inside of a cylindrical surface on which the ground surface of the wheel is projected in a direction of the final gear support shaft.

13. The wheel unit according to claim 9, wherein
a sum of a diameter of the final gear and a diameter of the large-diameter gear portion of any of the plurality of composite gears is greater than a radius of the ground surface.

14. The wheel unit according to claim 9, wherein
the entire final gear is positioned on the inside of the cylindrical or substantially cylindrical area surrounded by the ground surface.

15. The wheel unit according to claim 1, wherein
the motor includes a rotor magnet on an outside of an armature in a radial direction.

16. The wheel unit according to claim 1, further comprising:
a motor cover which accommodates the motor; and
a partition wall which is interposed between the gear case and the motor cover; wherein
the motor is fixed to the partition wall.

* * * * *